J. DUPUIS.
LINK BRAKE BELT.
APPLICATION FILED MAY 22, 1912.

1,085,029.

Patented Jan. 20, 1914.

WITNESSES
F. C. Barry
C. E. Trainor

INVENTOR
Joseph Dupuis
BY Munn & Co.
ATTORNEYS

UNITED STATES PATENT OFFICE.

JOSEPH DUPUIS, OF FALL RIVER, MASSACHUSETTS.

LINK BRAKE-BELT.

1,085,029. Specification of Letters Patent. Patented Jan. 20, 1914.

Application filed May 22, 1912. Serial No. 699,005.

*To all whom it may concern:*

Be it known that I, JOSEPH DUPUIS, a citizen of the United States, and a resident of Fall River, in the county of Bristol and State of Massachusetts, have made certain new and useful Improvements in Link Brake-Belts, of which the following is a specification.

My invention is an improvement in link brake belts, and has for its object the provision of a belt of the character specified, comprised of interengaging links, each link carrying a block of fibrous material, having a high coefficient of friction wherein a special form of holder is provided for supporting the block.

Figure 1:
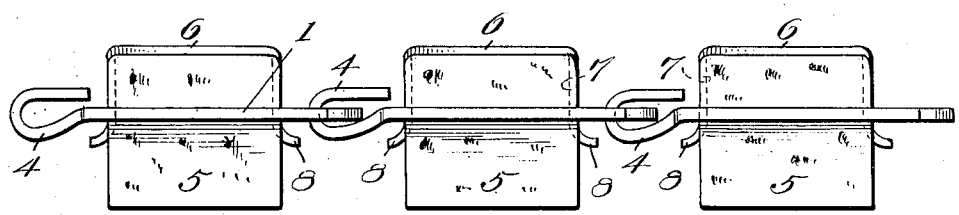
Figure 2:
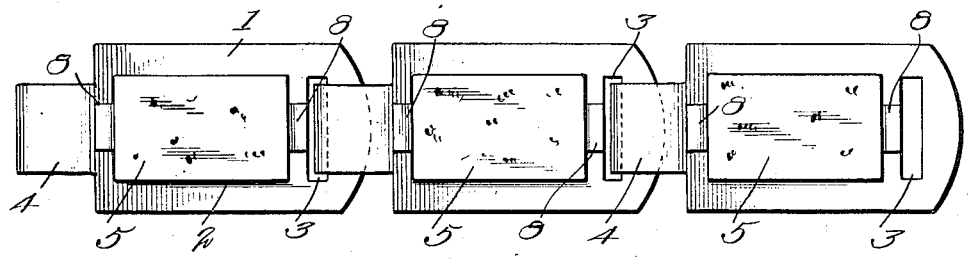
Figure 3:
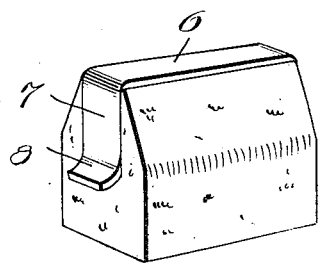

In the drawings Figure 1 is a side view of a portion of the improved belt, Fig. 2 is a plan view of a plurality of links, and Fig. 3 is a perspective view of a holder detached.

The present embodiment of the invention comprises a chain composed of links interengaging with each other, and each link is provided with a plug of cork, or similar elastic material having a high coefficient of friction. Each of the links 1 is stamped or cut from metal of suitable weight and is of approximately rectangular outline, having a central rectangular opening 2. Each link is in fact an open substantially rectangular frame. One of the end members of each frame or link is provided with a transverse slot 3, and the other end member is provided with a longitudinally extending hook 4, for engaging the slot of the adjacent link. The plug block or inset 5 of cork or like material is held in the central opening of the frame, by means of a substantially U-shaped holder, comprising a body 6, and resilient arms 7 extending laterally from the ends of the body. The body is of the same or slightly greater length than the length of the opening, so that it cannot pass through the opening while held parallel therewith, and each arm is provided with a stop at its free end for preventing withdrawal of the arm in the opposite direction. Each of the stops is in the form of an outwardly extending flange or lug 8, and the block is held between the arms. The arms are pressed together by their engagement with the ends of the opening, and embrace the block tightly enough to prevent dislodgment thereof.

Each of the hooks has its free end extending adjacent to the adjacent arm of the holder, and the said arrangement prevents the disengagement of the links, while the holders are in place. The blocks extend beyond both faces of the link, and one face of the block is free, so that it can engage the link or brake wheel. As the blocks become worn, the holders might be moved to extend a greater portion of the block from the link. It will be obvious that there is no tendency of the holder or block to move away from the link except in one direction, and the stops 8 effectually prevent this movement.

I claim:—

1. A chain comprising interengaging links, each link consisting of a substantially rectangular open frame composed of side and end members, one of the end members of each link having a transverse slot and the other end member having a hook for engaging the slot of the adjacent link, said hook comprising a longitudinally extending reduced portion bent back upon itself to form an overlying portion spaced apart from the main portion, a block or inset of cork in the opening of each frame and extending beyond both faces of the frame, and a holder for the block, said holder being substantially U-shaped and comprising a body and laterally extending resilient arms, the body being off-set laterally from the plane of the link and the arms extending through the opening of the frame and engaging the ends thereof and clamping the block between the arms, each arm having an outwardly bent lug at its free end.

2. A chain comprising interengaging links, each link consisting of a substantially rectangular open frame composed of side and end members, one of the end members of each link having a transverse slot and the other end member having a hook for engaging the slot of the adjacent link, a block or inset of cork in the opening of each frame and extending beyond both faces of the frame, and a holder for the block, said holder being substantially U-shaped and comprising a body and laterally extending resilient arms, the body being off-set laterally from the plane of the link and the arms extending through the opening of the frame and engaging the ends thereof and clamping the block between the arms, each arm having an outwardly bent lug at its free end.

3. A chain comprising interengaging links, each link consisting of a substantially rectangular open frame, composed of side and end members, one of the end members of each link having a transverse slot and the other end member having a hook for engaging the slot of the adjacent link, said hook comprising a longitudinally extending reduced portion bent back upon itself to form an overlying portion spaced apart from the main portion, a block or inset of cork in the opening of each frame and extending beyond both faces of the frame, and a holder for the block, said holder comprising a body on one side of the link and arms embracing the block and extending through the opening of the frame and engaging the ends thereof, and each arm having a stop at its free end to prevent withdrawal thereof.

4. A chain of the character specified, comprising connected links, each link having a central substantially rectangular opening, a substantially U-shaped holder in each opening, said holder comprising a body extending longitudinally of the chain and off-set laterally from the plane of the link, and resilient arms extending through the opening and engaging the ends thereof, each arm having a stop at its free end to prevent withdrawal thereof, and a block of cork seated in each holder and embraced by the arms and extending beyond the free ends thereof, each link having a transverse slot at one end and a hook at the other for engaging the slot of the adjacent link.

5. A chain of the character specified, comprising connected links, each link having a central substantially rectangular opening, a substantially U-shaped holder in each opening, said holder comprising a body extending longitudinally of the chain and off-set laterally from the plane of the link, and resilient arms extending through the opening and engaging the ends thereof, each arm having a stop at its free end to prevent withdrawal thereof, and a block of cork seated in each holder and embraced by the arms and extending beyond the free ends thereof.

6. A chain of the character specified, comprising connected links, each link having a central substantially rectangular opening, a substantially U-shaped holder in each opening, each holder comprising a body and laterally extending resilient arms, said arms extending transversely of the link through the opening and engaging opposite sides thereof, and a block of fibrous material seated in each holder and held by the arms, each arm having a stop at its free end for preventing withdrawal thereof, and the body being of approximately the same length as the opening.

7. A chain of the character specified, comprising connected links, each link having a central substantially rectangular opening, a substantially U-shaped holder in each opening, each holder comprising a body and laterally extending resilient arms, said arms extending transversely of the link through the opening and engaging opposite sides thereof, and a block of fibrous material seated in each holder and held by the arms and extending through the opening of the link, and means for preventing movement of the holder lateral to the link.

8. A chain of the character specified, comprising a plurality of connected links, each link having a transverse opening, a block of fibrous material in each opening and extending beyond both faces of the link, and a holder for the block in the opening, said holder comprising a body and laterally extending resilient arms engaging opposite sides of the opening.

9. A chain of the character specified, comprising a plurality of connected links, each link having a transverse opening, a block of fibrous material in each opening and extending beyond both faces of the link, and a holder for the block in the opening.

JOSEPH DUPUIS.

Witnesses:
DORMENT H. CASTELLAR,
NICHOLAS HATHAWAY.